(12) United States Patent
Chen

(10) Patent No.: US 6,892,608 B2
(45) Date of Patent: May 17, 2005

(54) TURNING DISC INTERMITTENT ROTARY MECHANISM

(76) Inventor: Chau-Tsung Chen, P.O. Box No. 6-57, Chung-Ho, Taipei 235 (TW)

( * ) Notice: Subject to any disclaimer, the term of this patent is extended or adjusted under 35 U.S.C. 154(b) by 106 days.

(21) Appl. No.: 10/374,996

(22) Filed: Feb. 28, 2003

(65) Prior Publication Data

US 2004/0168546 A1 Sep. 2, 2004

(51) Int. Cl.$^7$ ............................................. F16M 27/04
(52) U.S. Cl. ............................ 74/820; 74/84 R; 74/436
(58) Field of Search ............................... 74/84 R, 436, 74/569, 570, 813 R, 820

(56) References Cited

U.S. PATENT DOCUMENTS

| | | | | |
|---|---|---|---|---|
| 3,153,952 A | * | 10/1964 | Thoma | 74/822 |
| 3,653,275 A | * | 4/1972 | Leacock | 74/436 |
| 3,827,312 A | * | 8/1974 | Bristol et al. | 74/436 |
| 3,835,723 A | * | 9/1974 | Zugel | 74/436 |
| 3,977,263 A | * | 8/1976 | Nara | 74/129 |
| 4,512,214 A | * | 4/1985 | Surman | 74/820 |
| 4,724,760 A | * | 2/1988 | Bubley | 101/115 |
| 5,176,036 A | * | 1/1993 | Harris | 74/24 |
| 5,321,988 A | * | 6/1994 | Folino | 74/25 |
| 5,768,757 A | * | 6/1998 | Link | 29/48.5 R |
| 6,615,690 B2 | * | 9/2003 | Chen | 74/820 |

\* cited by examiner

*Primary Examiner*—William C. Joyce
*Assistant Examiner*—Julie K. Smith
(74) *Attorney, Agent, or Firm*—Troxell Law Office, PLLC

(57) ABSTRACT

A turning disc intermittent rotary mechanism in accordance with the invention includes at least one top disc flexibly mounted to a bottom seat, wherein at the center of the top disc is provided with a through hole and the bottom surface thereof is provided with sliding slots; and a main driving wheel flexibly mounted to the bottom seat using a round through hole provided in advance, wherein at the side of the upper surface of the main driving wheel is provided with a small pulley that is disposed in the sliding slots and is capable of sliding. Consequently, the force produced by the small pulley acting at the long sliding slot thereof is effectively reduced, thereby lengthening the lifespan of the force transmission mechanism including the small pulley and the main driving wheel.

3 Claims, 6 Drawing Sheets

TURNING DISC INTERMITTENT ROTARY MECHANISM

BACKGROUND OF THE INVENTION (a) Field of the Invention

The invention relates to a turning disc intermittent rotary mechanism, and more particularly, to an innovation from the patent application disclosed by the U.S. application Ser. No. 09/844,900.

(b) Description of the Prior Art

In the patent application of the present inventor disclosed by the U.S. application Ser. No. 09/844,900, the techniques thereof are that a small pulley 34 rotates regarding an axis of a main driving wheel 30 as the center of rotation thereof, so that the small pulley 34 is enabled to move inside plum blossom-patterned sliding slots 14 and further impel the intermittent rotation and dwelling of a top disc 10.

Although the above patent application is indeed quite practical, improvements shall yet be made in the long term as illustrated hereunder.

Referring to FIG. 6 showing a planar view illustrating the bottom surface of the top disc 10 in accordance with the patent application disclosed by the U.S. application Ser. No. 09/844,900, when the small pulley 34 rotates in the plum blossom-patterned slots 14, the small pulley 34 acts and generates a force against the slot walls for further impelling the action region, namely the long sliding slot 143, of the turning disc. The radian of the arcuate sliding slot therein 146 is the same as that of the small pulley 34, and therefore the small pulley 34 does not produce an effective force against the slot wall of the arcuate sliding slot 146. The small pulley 34 then displaces in idle, and the top disc is resultingly in a brake state without any rotation. On the other hand, when the small pulley 34 slides and moves in circulation in the arcuate sliding slot 146 and the long sliding slot 143, the top disc 10 is impelled for intermittent pauses and rotation. When the force of the small pulley 34 acts at the region of the long sliding slot 143, the center of the small pulley 34 forms a short lever of force R1 with the center of a through hole 12; when the small pulley 34 runs idle in the arcuate sliding slot 146, the center of the small pulley 34 forms a long lever of force R2 with the center of the through hole 12. It is apparent that when the small pulley 34 impels and acts at the long sliding slot 143, the force of the small pulley 34 acting against the slot wall of the long sliding slot 143 is correspondingly larger because of the larger force of the small pulley 34 acting at the long sliding slot 143 due to the shorter length of the short lever of force R1. Vice versa, although the long lever of force R2 is longer in length, it does not act against (no force is produced) the slot wall of the arcuate sliding slot 146. For that the length of the short lever of force R1 is shorter and the force (power) of the small pulley 34 for impelling and rotating the top disc 10 is correspondingly larger, the friction between the small pulley 34 and the long sliding slot 143 is consequently increased, exposing the small pulley 34 to larger damages when the transmission mechanism operates in the long run.

SUMMARY OF THE INVENTION

Therefore, the object of the invention is to provide a turning disc intermittent rotary mechanism, in which a long sliding slot and an arcuate sliding slot thereof are disposed reversely from those of the prior art, that is, on the lower surface of a top disc thereof. As a result, a lever of force of a small pulley thereof acting at the long sliding slot is longer in length, so that the top disc is impelled and rotated while also efficiently reducing the force imposed against the slot wall of the long sliding slot by the small pulley, thereby maximizing the forces of the small pulley and a main driving wheel of the transmission mechanism for further lengthening the lifespan thereof as a whole.

DESCRIPTION OF THE PREFERRED EMBODIMENTS

To better understand the characteristics and functions of the invention, descriptions shall be given with the accompanying drawings hereunder.

Figure 1:
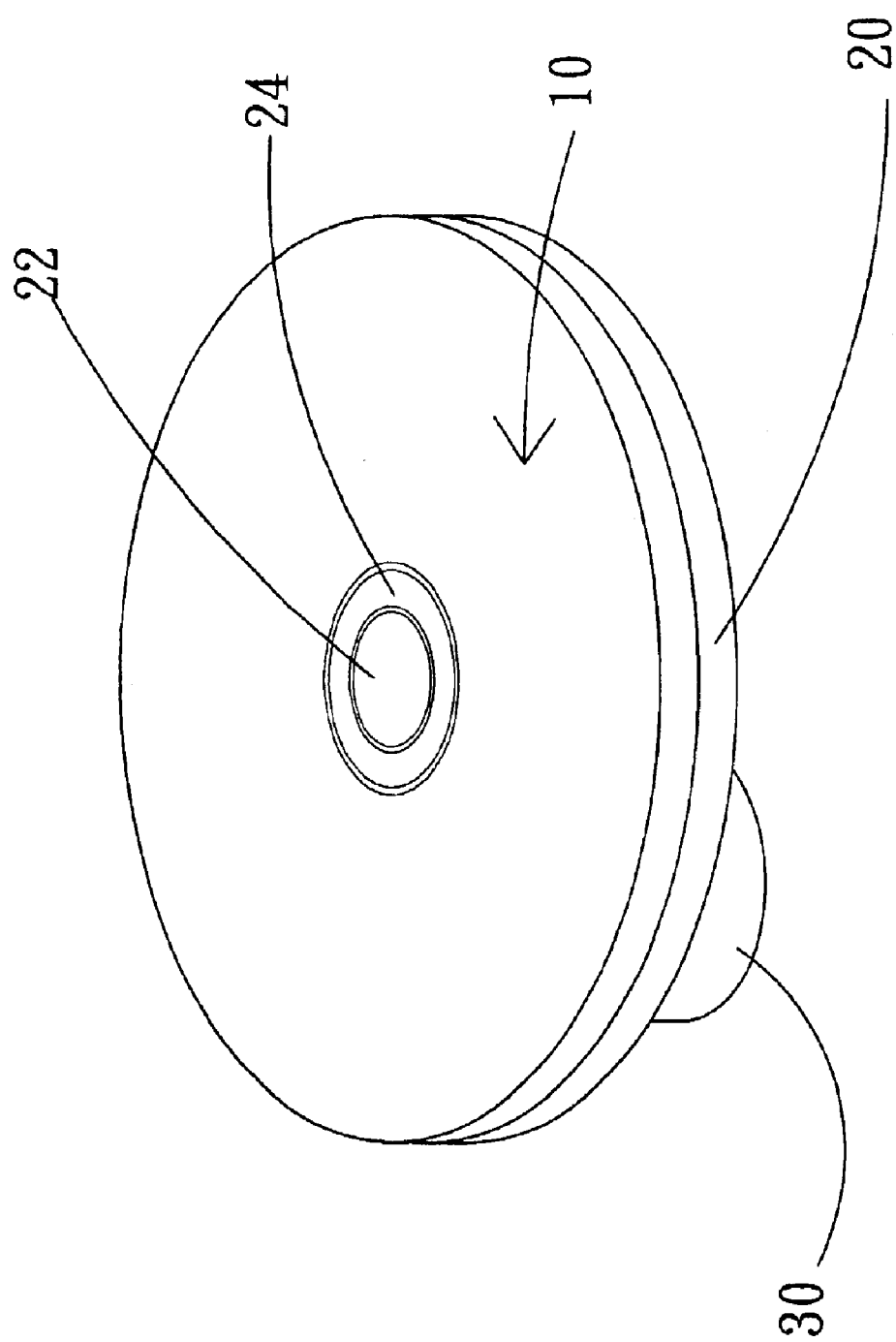
FIG. 1 shows an elevational schematic view in accordance with the invention.
Figure 2:
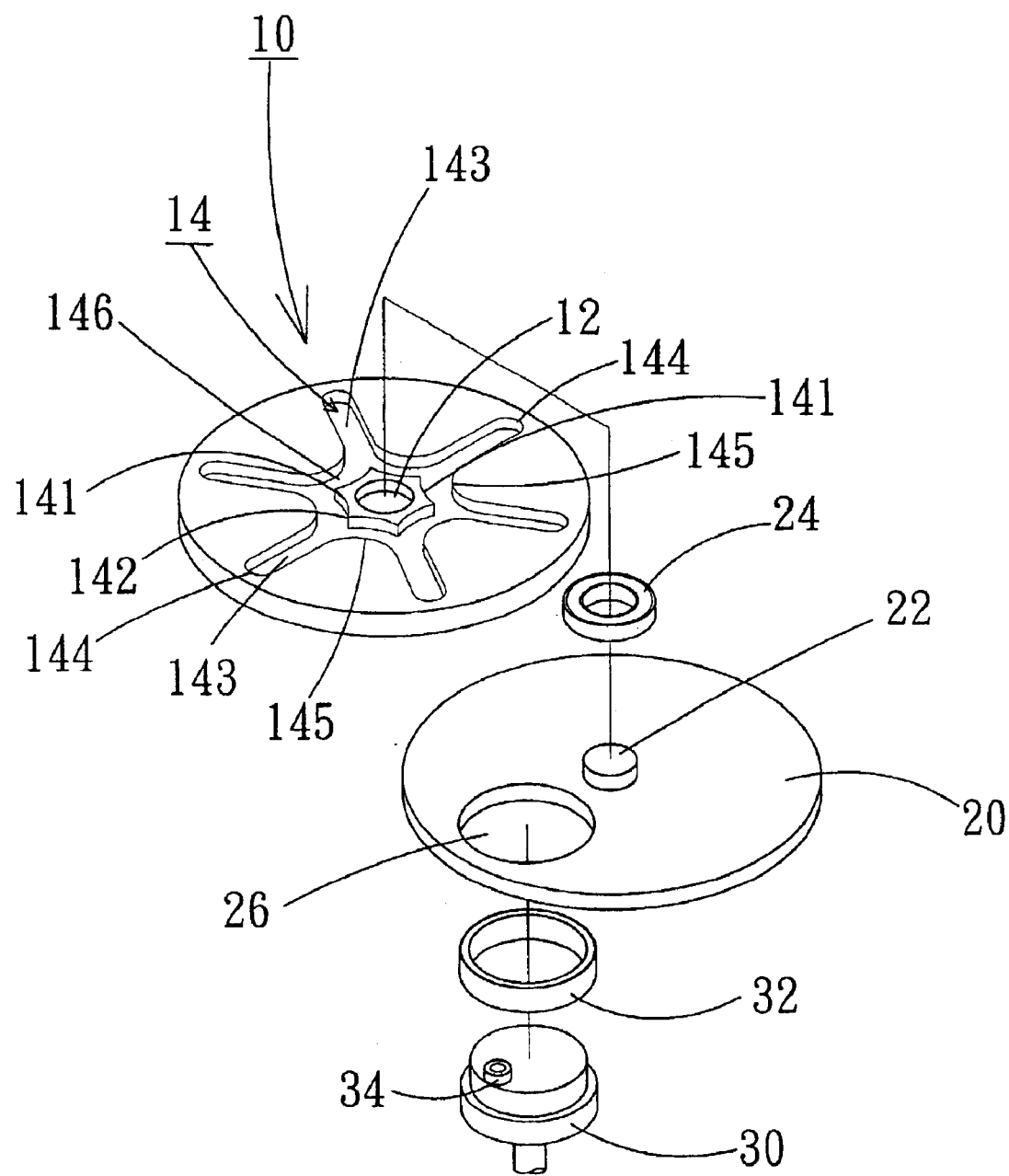
FIG. 2 shows another elevational schematic view in accordance with the invention.

Referring to FIGS. 1 and 2, the invention comprises:

- at least one top disc 10 flexibly mounted on a bottom seat 20; wherein at the center of the top disc 10 is provided with a through hole 12 and the bottom surface thereof is provided with sliding slots 14;
- a main driving wheel 30 flexibly mounted to the bottom seat 20 using a round through hole 26 provided in advance, wherein at the side of the upper surface of the main driving wheel 30 is provided with a small pulley 34 that is disposed in the sliding slots 14 and is capable of sliding; and
- the characteristics thereof are that an arcuate sliding slot 146 of the sliding slot 14 is disposed near the edge of the through hole 12 at the top disc 10, and the long sliding slot 143 is located at the outer edge of the arcuate sliding slot 146.

In accordance with the aforesaid characteristics, the edge of the through hole 12 at the center of the top disc 10 forms continuous and regular arcuate walls 141; a diagonal section 142 is formed between two adjacent arcuate walls 141; a long stripped sliding slot 143 is formed at the corresponding side of the diagonal section 142; a semi-circular arcuate wall 144 is formed at the wall plane at the bottom of the long sliding slot 143; and an oval convex body 145 is formed on the slot wall plane corresponding to the arcuate wall 141.

Figure 3:
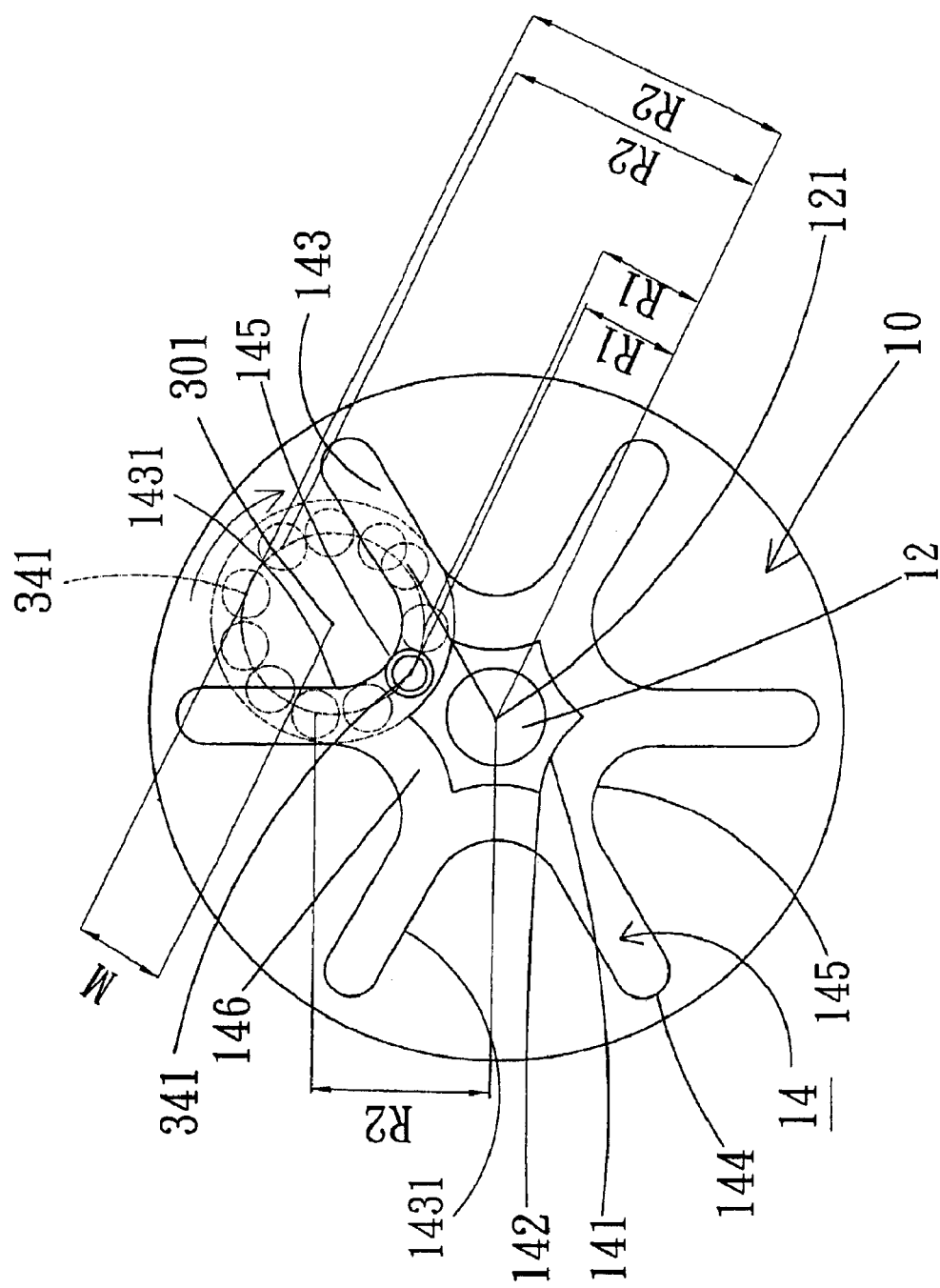
FIG. 3 shows a planar view of the small pulley acting at the sliding slot of the top disc in accordance with the invention.
Figure 4:
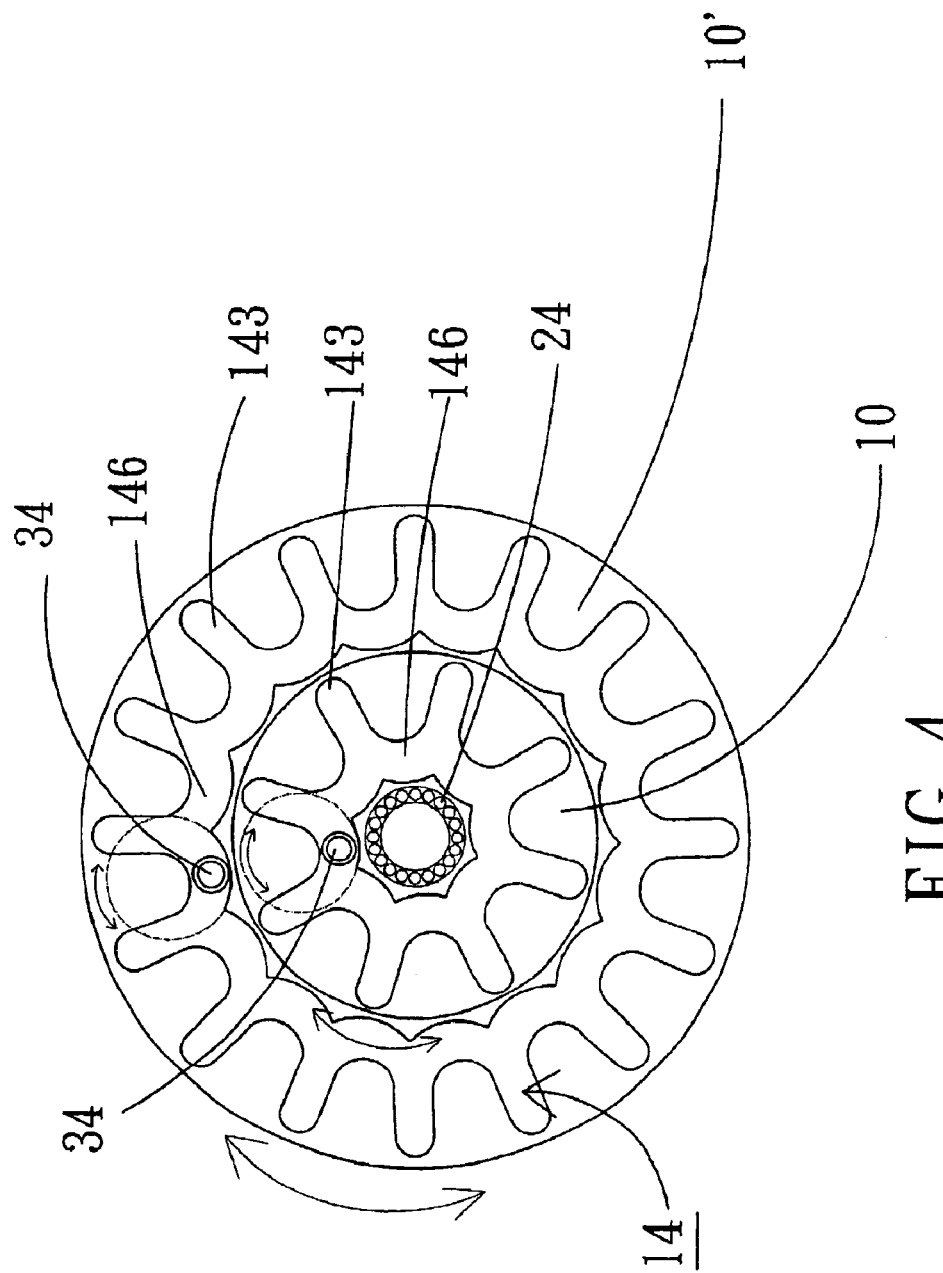
FIG. 4 shows a planar view illustrating lower surface of two layered top discs.

In accordance with the aforesaid characteristics, when the small pulley 34 rotates regarding a center 301 of the main driving wheel 30 as the center of rotation thereof, the small pulley 34 is able to displace and slide in the long sliding slot 143 and the arcuate sliding slot 146 (as shown in FIG. 3), such that the small pulley 34 produces a force against the slot wall plane 1431 of the long sliding slot 143 for impelling and rotating the top disc 10. When the small pulley 34 displaces and slides in the arcuate sliding slot 146, the rotation radian of the small pulley 34 is equal to radian of the slot wall plane of the oval convex body 145, so that the small pulley does not impose a force against the oval convex body 145, and the top disc 10 remains still as a result.

In accordance with the aforesaid characteristics, the top disc 10 may be a design having two or more layered top discs that are capable of sliding; the main driving wheel 30 may be a design having two or more main driving wheels, wherein the small pulley 34 of each independent main driving wheel capable of sliding is connected to the sliding slot 14 of one of the top discs 10 and 10'.

In accordance with the aforesaid characteristics, the embodiments in accordance with the invention have the advantages described below.

1. Referring to FIGS. 1 and 2, similar to the patent application disclosed by the U.S. patent Ser. No. 09/844,900, the top disc 10 in accordance with the invention is flexibly mounted to a central convex section 22 on the bottom seat 10 by a bearing 24, and the main driving wheel 30 is flexibly mounted to the round through hole 26 by a bearing 32. The distinguishability between the two is that the arcuate sliding slot 146 in accordance with the invention is reversely disposed at the inner part of the inner surface of the top disc 10 and is close to the edge of the through hole 12, and the long sliding slot 143 is disposed near the outer edge of the inner surface of the top disc 10. When the small pulley 34 slides in the arcuate sliding slot 146, the distance between the center 341 thereof and the center 121 of the through hole 12 form a short lever of force R1; when the small pulley 34 slides in the long stripped sliding slot 143, the distance between the center 341 thereof and the center 121 of the through hole 12 form a long lever of force R2. Wherein, the force of the small pulley 34 acting at the plum blossom-patterned sliding slots 14 is F, the distance between the center 301 of the main driving wheel 30 and the center 341 of the small pulley 34 is a rotation radius M. Based upon the principle of dynamics, rotation radius M=short lever of force R1×force F, or rotation radius M=long lever of force 2×force F; that is, force F=rotation radius M/short lever of force R1 or force=rotation radius M/long lever of force R2, wherein the short and long levers of force R1 and R2 are varied accordingly with the shifts of rotation positions of the small pulley 34. It is obtained from the principle of dynamics that, the distance of the long lever of force R2 is larger (that is, R2>R1) when the small pulley acts at the long sliding slot 143, and so when the rotation radius M is a constant and the small pulley 34 acts at the long sliding slot 143, the force F produced by the small pulley 34 acting at the long sliding slot 143 is relatively smaller. Vice versa, when the distance of the short lever of force F1 is smaller and the small pulley 34 slides in the arcuate 146, the force F produced by the small pulley 34 is comparatively larger. However, friction is not caused from the small pulley 34 running idle in the arcuate sliding slot 146, and therefore the value of F at this particular region is not taken into consideration. It is then apparent that the design of having the long sliding slot 143 disposed near the outer edge of the inner surface of the top disc 10 enables the small pulley 34 to impel and rotate of top disc 10 mounted above the bottom seat 20 while requiring a comparatively smaller force, thereby increasing the operational lifespan of the force transmission mechanism including the small pulley 34 and the main driving wheel 30.

Figure 5:
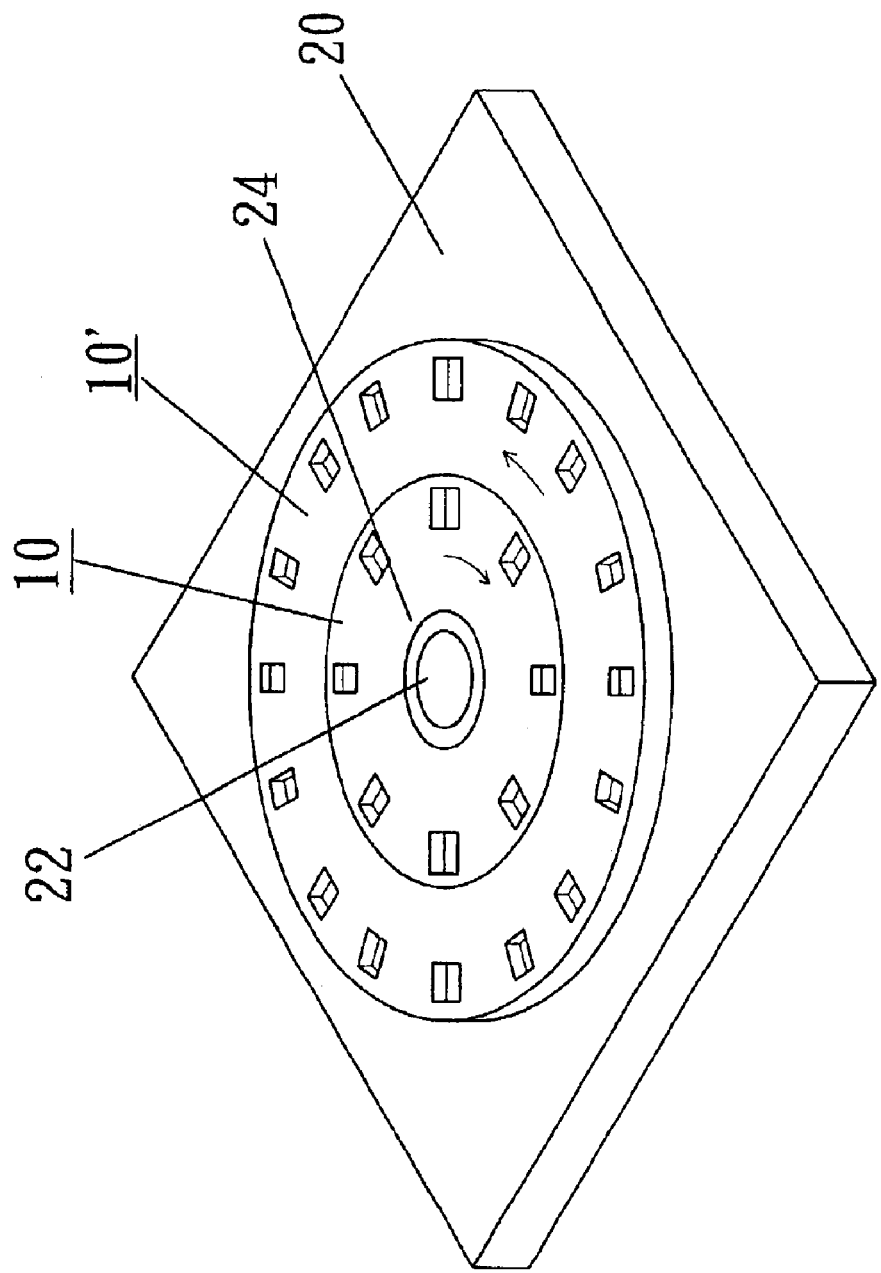
FIG. 5 shows an elevational schematic view of an embodiment in accordance with the invention applied in a processor.
Figure 6:
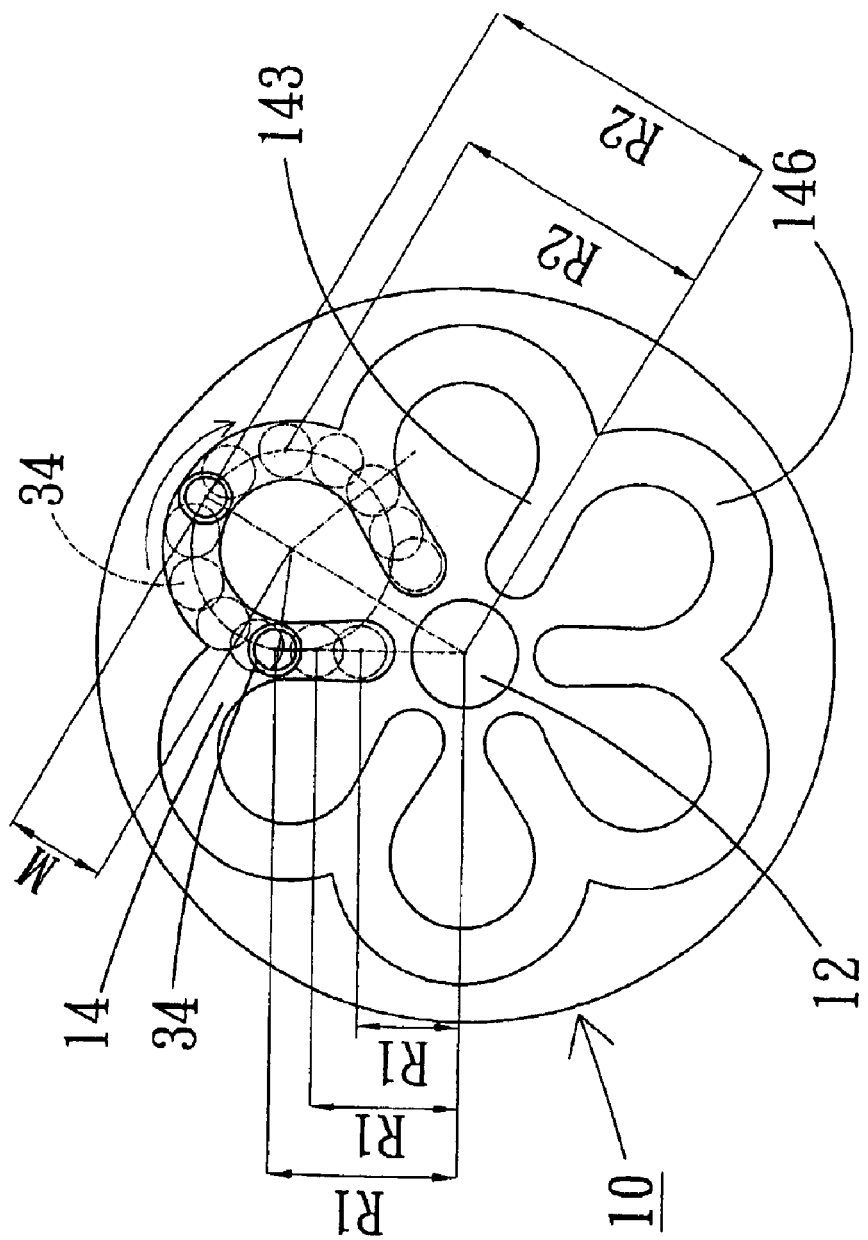
FIG. 6 shows a planar schematic view illustrating the lower surface of the top disc in accordance with the patent application disclosed by the U.S. application Ser. No. 09/844,900.

2. Referring to FIG. 3, the invention may also be applied by layering two top discs 10 and 10'. When the force therein is initiated, the small pulley 34 is enabled to move in the plum blossom-patterned slots 14 for further impelling the rotating the two top discs 10 and 10' in the same or opposite directions. Referring to FIG. 5, the top disc 10 is flexibly mounted to the central convex section 22 on the bottom seat 10 by the bearing 24, and therefore the two top discs 10 and 10' are impelled for intermittent rotation and pauses in forward and reverse directions regarding the central convex section 22 as the axis thereof.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A turning disc intermittent rotary mechanism comprising:

at least one top disc flexibly mounted to a bottom seat, wherein at a center of the top disc is provided with a through hole and a bottom surface thereof is provided with sliding slots;

a main driving wheel flexibly mounted to the bottom seat using a round through hole, wherein at a side of an upper surface of the main driving wheel is provided with a small pulley that is disposed in the sliding slots and is capable of sliding; and an arcuate sliding slot in the sliding slot is disposed on an edge of the through hole in the top disc, and a long sliding slot is located on an outer edge of the arcuate sliding slot, wherein the edge of the through hole at the center of the top disc forms continuous and regular arcuate walls; a diagonal section is formed between two adjacent arcuate walls; a long stripped sliding slot is formed at the corresponding side of the diagonal section; a semi-circular arcuate wall is formed at the wall plane at the bottom of the long sliding slot; and an oval convex body is formed on the slot wall plane corresponding to the arcuate wall.

2. The turning disc intermittent rotary mechanism in accordance with claim 1, wherein when the small pulley rotates with a center of the main driving wheel as a center of rotation the small pulley is able to displace and slide in the long sliding slot and the arcuate sliding slot, such that the small pulley produces a force against the slot wall plane of the long sliding slot for impelling and rotating the top disc; when the small pulley displaces and slides in the arcuate sliding slot, the rotation radian of the small pulley is equal to radian of the slot wall plane of the oval convex body, so that the small pulley does not impose a force against the oval convex body, and the top disc remains still as a result.

3. The turning disc intermittent rotary mechanism in accordance with claim 1, wherein the top disc has two or more layered top disc that are capable of sliding; the main driving wheel has two or more main driving wheels, wherein the small pulley of each independent main driving wheel capable of sliding is connected to the sliding slot of one of the top disc.

* * * * *